United States Patent [19]
Chi

[11] Patent Number: 5,136,370
[45] Date of Patent: Aug. 4, 1992

[54] PRIMARY COLOR FORMING CIRCUIT FOR COMPLEMENTARY COLOR FILTER CCD

[75] Inventor: Young-bae Chi, Suwon, Rep. of Korea

[73] Assignee: Samsung Electronics, Ltd., Kyunggi-do, Rep. of Korea

[21] Appl. No.: 636,259

[22] Filed: Dec. 31, 1990

[30] Foreign Application Priority Data

Dec. 31, 1989 [KR] Rep. of Korea ............. 89-21366

[51] Int. Cl.$^5$ ............................................. H04N 9/07
[52] U.S. Cl. ..................................... 358/44; 358/30
[58] Field of Search .................... 358/30, 41, 43, 44

[56] References Cited

U.S. PATENT DOCUMENTS

| | | | |
|---|---|---|---|
| 4,246,601 | 1/1981 | Sato et al. | 358/44 |
| 4,516,154 | 5/1985 | Nishizawa et al. | 358/44 |
| 4,556,900 | 12/1985 | Willis | 358/30 |
| 4,670,777 | 6/1987 | Ishikawa | 358/44 |
| 4,768,084 | 8/1988 | Noda et al. | 358/44 |
| 4,827,331 | 5/1989 | Nakamura et al. | 358/44 |
| 4,884,129 | 11/1989 | Ozawa et al. | 358/44 |
| 4,907,074 | 3/1990 | Hashimoto | 358/44 |
| 4,939,573 | 7/1980 | Teranishi et al. | 358/44 |

*Primary Examiner*—Leo H. Boudreau
*Assistant Examiner*—David Fox
*Attorney, Agent, or Firm*—Cushman, Darby & Cushman

[57] ABSTRACT

The present invention relates to a primary color forming circuit for a complementary color CCD in which complmentary color pixels are arrayed in a predetermined pattern to form lines which have the same pattern as every other line. The output of one line is delayed by one line drive period and combined with the output of the next line to form source signals. Pseudo primary colors are obtained by combining these source signals with appropriate coefficients. Therefore, the present invention provides an image pickup apparatus which has advantages of both a complementary color filter CCD and a primary color CCD.

5 Claims, 2 Drawing Sheets

PRIMARY COLOR FORMING CIRCUIT FOR COMPLEMENTARY COLOR FILTER CCD

FIELD OF THE INVENTION

The present invention relates to a primary color forming circuit for a complementary color filter CCD.

BACKGROUND OF THE INVENTION

A charge coupled device (CCD) is widely used as a solid image pickup element employing photoelectric conversion. A color CCD, in which color pixels are arrayed, contributes greatly to minimizing image pickup in devices such as a video camera. But, a primary color CCD in which three primary color pixels are arrayed has problems of sensitivity and blooming. Thus, a complementary color filter CCD with complementary color filters of high light utility is widely used. The complementary color filter CCD has merits of high resolution and high sensitivity as well as advantages in that blooming or color mixing don't occur. However, even when the complementary color CCD is used, formation of primary colors R, G, B is occasionally needed for matching to other image apparatus. Unfortunately, conventional complementary color filter CCDs are incapable of producing primary colors.

SUMMARY OF THE INVENTION

Therefore, it is an object of the present invention to provide a circuit to form video signals of primary colors R, G, B from video signals obtained from the complementary color filter CCD.

In achieving the above object, a primary color forming circuit for a complementary color CCD according to the present invention comprises:

CCD means for producing four complementary color signals, in which pixels are sequentially arrayed in a predetermined pattern to form lines, and the pixel lines are sequentially arrayed in the same pattern as every other line;

sample/hold means for selecting two signals out of output signals of the CCD means;

computing means for forming a sum signal and a difference signal of the signals selected by the sample/hold means;

delay means for delaying the difference signal by a line drive period of the CCD means;

multiplexing means for selecting an R source signal and a G source signal on receiving the difference signal and the delay signal; and matrix means for forming primary colors by combining the source signals and the sum signal of the computing means with predetermined coefficients.

BRIEF DESCRIPTION OF THE DRAWINGS

These and other advantages of the present invention will be more apparent by describing a preferred embodiment of the present invention with reference to the attached drawings, in which.

DETAILED DESCRIPTION

Figure 1:
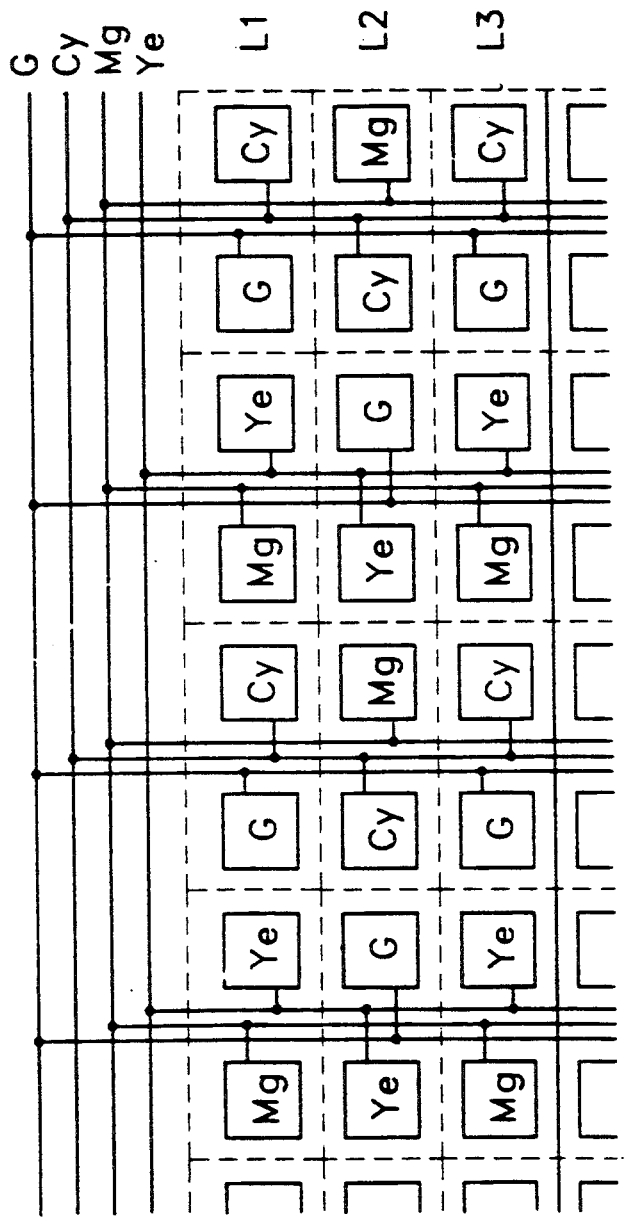
FIG. 1 is a schematic plan view showing a general structure of a complementary color filter.

Pixels of Magenta Mg, Yellow Ye, Green G, and Cyan Cy are arrayed in a predetermined matrix pattern in a conventional complementary color filter CCD as shown in FIG. 1. For example, in the first line L1 of these pixels, Mg-Ye and GCy pixel couples, each being driven simultaneously, are alternately arrayed and in the second line L2, Ye-G and Cy-Mg pixel couples are arrayed alternately. The third line L3 has the same array as the first line L1. According to this matrix pattern, the pixel couples are arrayed in the same pattern in every other line.

In the CCD, pixel couples of the first line L1 are driven in sequence, for example, from the left side by an unshown drive circuit. The CCD produces a signal corresponding to the pertinent color through output terminals shown on the upper part of the drawing. After the pixel couples of the first L1 are all driven pixel couples of the next line L2 are sequentially driven from the left side, thereby finishing driving of the whole lines to scan one frame. The drive period of each pixel couple in each line is designated as 1T, and the drive period of each line is designated as 1H.

Figure 2:
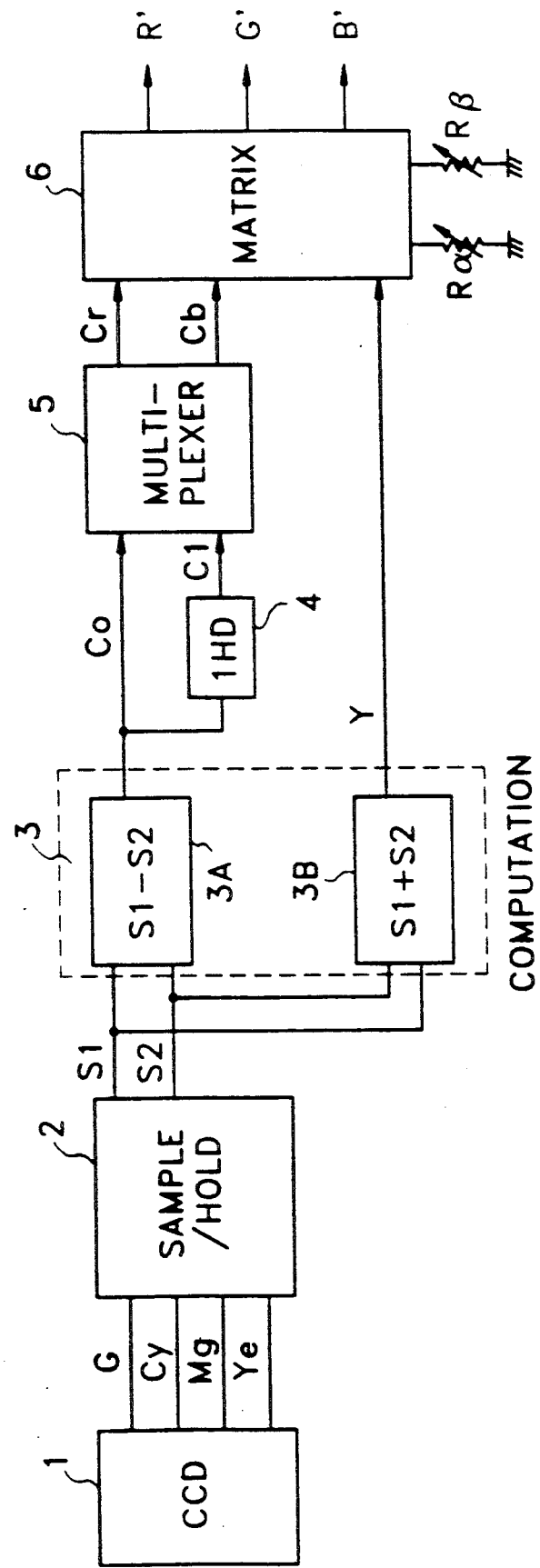
FIG. 2 is a block diagram showing a primary color forming circuit according to the present invention.

In FIG. 2, sample/hold means 2 for receiving and producing sums of output signals of pixel couples is connected to the output terminal of the CCD means 1 shown in FIG. 1. This sample/hold means 2 temporarily stores the signal S1, representing the sum of output of the one pixel couple, for a period 1T and then supplies the signal S1 along with the signal S2, representing the sum of the output of the next pixel couple, to the computing means 3.

The computing means 3 consists of a substracter 3A to compute the difference of the two signals S1, S2 and an adder 3B to compute the sum of the signals S1 and S2. A difference signal Co output from the subtracter 3A is delayed by.1H in the delay means 4 to produce delayed signal C1. The signals C0 and C1 are supplied to a multiplexing means 5 which produces an R source signal Cr and a B source signal Cb by alternately selecting difference signal Co and delayed signal C1 in sequence. The R source signal Cr and the B source signal Cb are fed to a matrix means 6, along with the output Y from the adder 3B of the computing means 3. The matrix means 6 forms and produces primary colors R, G, B by combining these input signals Cr, Cb, Y with coefficients $\alpha$, $\beta$ defined by a coefficient adjuster $R^\alpha$, $R^\beta$.

The operation of a primary color forming circuit according to the present invention is as follows.

In FIG. 1, as the Mg-Ye pixel couple on the left side in the first line L1 is driven by an unshown drive circuit, photoelectric signals Mg and Ye are supplied to sample/hold means 2 in FIG. 2 through each output line and are temporarily stored in the sample/hold means 2 as signal S1=Mg+Ye. The next pixel couple G-Cy, being driven after a period, is supplied to the sample/hold means 2 which provies signal S2=G+Cy. Signals S1 and S2 are respectively supplied to the computing means 3.

In the computing means 3, a difference signal S1−S2 of the two signals is computed in the substracter 3A, and a sum signal Y of the two signals is computed in the adder 3B, and then the difference signal and the sum signal are outputted. When scanning of the pixel couples in the first line L1 is completed according to the process described above, scanning of pixel couples in the second line L2 is started and the process described above is repeated. Therefore, in the scanning of the second line L2, signals S1=Ye+G and S2=Cy+Mg are supplied to the computing means 3, and adding and subtracting are carried out thereat.

The above signal processing in the computing means 3 has the following physical meanings.

When the components of the three primary colors are designated as R, G, B, $$Cy = B + G$$

$$Mg = R + B$$

$$Ye = R + G$$

Therefore, in the signal processing of the first line L1, in the adder 3B, $$\begin{aligned} S1 + S2 &= (Mg + Ye) + (G + Cy) \\ &= \{(R + B) + (R + G)\} + \{G + (B + G)\} \\ &= 2R + 2B + 3G \end{aligned}$$

and the result becomes the combination of luminance signal Y. And, in the subtractor 3A, $$\begin{aligned} S1 - S2 &= (Mg + Ye) - (G + Cy) \\ &= \{(R + B) + (R + G)\} - \{G + (B + G)\} \\ &= 2R - G \end{aligned}$$

In signal processing of the second line L2, $$\begin{aligned} S1 + S2 &= (Ye + G) + (Cy + Mg) \\ &= \{(R + G) + G\} + \{(B + G) + (R + B)\} \\ &= 2R + 2B + 3G \\ &= Y \end{aligned}$$

$$\begin{aligned} S1 - S2 &= (Ye + G) - (Cy + Mg) \\ &= \{(R + G) + G\} - \{(B + G) + (R + B)\} \\ &= -(2B - G) \end{aligned}$$

That is, the sum signal S1+S2 in each line becomes a luminance signal Y. The difference signal obtained from the first line L1 becomes 2R−G, and the difference signal obtained from the second line L2 becomes −(2B−G). Thus, the result 2R−G and −(2B−G) are alternately produced from the subtracter 3A according to the drive period 1H of each line because pixel couples are arrayed identically in every other line.

Accordingly, when the difference signal Co of one line is 2R−G, the delay signal C1 of the former line delayed by the delay means 4 by 1H becomes −(2B−G). On the contrary, when the difference signal Co is −(2B−G), the delay signal C1 becomes 2R−G.

Multiplexing means 5 selects R source signal Cr=2R−G and B source signal Cb=−(2B−G) on receiving the difference signal Co and the delay signal C1, and supplies the signals Cr and Cb to the matrix means 6. The matrix means 6 forms primary color signals R′, G′, B′ on receiving two source signals Cr, Cb and luminance signal Y, supplied from the computing means 3, and multiplies these signals by coefficients $\alpha$, $\beta$ set by the adjuster R$\alpha$, R$\beta$.

The matrix combination is executed according to the following relations:

$$R' = Cr + \alpha \cdot Y$$

$$G' = Y - Cr + Cb$$

$$B' = -Cb + \beta \cdot G'$$

In more detail, $$\begin{aligned} R' &= Cr + \alpha \cdot Y \\ &= (2R - G) + \alpha(2R + 2B + 3G) \\ &= 2(1 + \alpha)R + (3\alpha - 1)G + 2\alpha \cdot B \end{aligned}$$

$$\begin{aligned} G' &= Y - Cr + Cb \\ &= 2R + 2B + 3G - (2R - G) - (2B - G) \\ &= 5G \end{aligned}$$

$$\begin{aligned} B' &= -Cb + \beta \cdot G' \\ &= 2B - G + \beta \cdot 5G \\ &= 2B + (5\beta - 1)G \end{aligned}$$

Appropriate pseudo-primary colors R′, G′, B′ are obtained by adjusting the coefficients $\alpha$, $\beta$ in the above formula. For example, if $\alpha = 0.33$, $\beta = 0.2$, then R′=2.66R+0.66B, G′=5G, B′=2B are obtained. In R′, B the component can be ignored because it is relatively small, as compared with the R component. As a result, four complementary colors G, Ye, Mg, Cy produced from CCD means 1, form primary colors R′, G′, B′ as pseudo-signals.

In the above description, the present invention is explained to be applied to a CCD with pixel couples, but the present invention can be applied to a CCD with single pixels by taking advantage of the regularity of the array. In addition, construction to average output signals including 2H delay operating in delay means can also be adopted.

According to the present invention, there can be provided an video apparatus which has advantages of a complementary color filter CCD and a primary color CCD at the same time because it can produce primary colors from the output of a complementary color CCD.

What is claimed is:

1. A primary color signals generating circuit for a complementary filter CCD comprising:

CCD means for producing a plurality of four complementary color signals corresponding to four different complementary colors during first and second horizontal line scanning periods, in which a plurality of pixel couples are sequentially arrayed in a predetermined pattern to form pixel lines, and every other one of said pixel lines has the same sequentially arrayed pattern;

sample/hold means for repeatedly generating one preliminary signal from two of said four complementary color signals output from one pixel couple in said CCD means and a second preliminary signal from the other two of said four complementary color signals output from another pixel couple in said CCD means for each pair of one and another pixel couples during first and second horizontal scanning periods;

computing means for computing a first sum signal and a first difference signal from the preliminary signals generated by said sample/hold means during said first horizontal scanning period, and a second sum signal and a second difference signal during said second horizontal scanning period;

delay means for delaying said first difference signal by a time period required to drive said pixels in one of said pixel lines of said CCD means, to produce a delayed signal;

multiplexing means for selecting an R source signal and a B source signal on receiving said second difference signal and said delayed signal; and matrix means for forming primary color output signals by combining said source signals and said second sum signal with predetermined coefficients, said predetermined coefficients being determined using resistors acting in conjunction with said matrix means, wherein a first resistor relates said R source signal and said second sum signal to a primary color output signal corresponding to red, and a second resistor relates said B source signal, said R source signal and said second sum signal to a primary color output signal corresponding to blue.

2. A primary color signals generating circuit for a complementary filter CCD according to claim 1, wherein successive pixel couples on the same pixel line comprise different pixel color combinations.

3. A primary color signals generating circuit for a complementary filter CCD according to claim 2, wherein pixel couples on a first pixel line alternately comprise a Magenta-Yellow color combination, and a Green-Cyan color combination, and pixel couples on a second pixel line alternately comprise a Yellow-Green color combination and a Cyan-Magenta color combination.

4. A primary color signals generating circuit for a complementary filter CCD according to claim 1, wherein, during said first horizontal scanning period, one of said preliminary signals generated by said sample/hold means represents the sum of said complementary color signals corresponding to a Magenta-Yellow pixel couple and the other of said preliminary signals represents the sum of said signals corresponding to a Green-Cyan pixel couple, and, during said second horizontal scanning period, one of said preliminary signals generated represents the sum of said complementary color signals corresponding to a Yellow-Green pixel couple and the other of said preliminary signals represents the sum of said signals corresponding to a Cyan-Magenta pixel couple.

5. A primary color signals generating circuit for a complementary filter CCD according to claim 1, wherein said resistors have a variable resistance.

* * * * *